US009260152B2

(12) United States Patent
Chipp

(10) Patent No.: US 9,260,152 B2
(45) Date of Patent: *Feb. 16, 2016

(54) SUB-FRAME AND COMPONENT CONFIGURATION FOR MOUNTING OF A MOTORCYCLE DROP SEAT

(71) Applicant: Gary D. Chipp, Chariton, IA (US)

(72) Inventor: Gary D. Chipp, Chariton, IA (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/075,552

(22) Filed: Nov. 8, 2013

(65) Prior Publication Data

US 2014/0062059 A1  Mar. 6, 2014

Related U.S. Application Data

(63) Continuation of application No. 12/804,626, filed on Jul. 26, 2010, now Pat. No. 8,616,324.

(60) Provisional application No. 61/271,697, filed on Jul. 25, 2009.

(51) Int. Cl.
| | | |
|---|---|---|
| *B62D 21/00* | (2006.01) | |
| *B62K 11/02* | (2006.01) | |
| *B62J 1/12* | (2006.01) | |
| *B62K 11/04* | (2006.01) | |
| *B62K 19/36* | (2006.01) | |
| *B62K 19/30* | (2006.01) | |

(52) U.S. Cl.
CPC . *B62K 11/02* (2013.01); *B62J 1/12* (2013.01); *B62K 11/04* (2013.01); *B62K 19/30* (2013.01); *B62K 19/36* (2013.01); *Y10T 29/49002* (2015.01)

(58) Field of Classification Search
USPC .......... 180/219, 225, 229, 311, 312; 280/299, 280/302, 785
See application file for complete search history.

(56) References Cited

U.S. PATENT DOCUMENTS

| | | | |
|---|---|---|---|
| 5,484,221 A | 1/1996 | DeCoux | |
| 5,704,442 A | 1/1998 | Okazaki et al. | |
| 5,975,230 A | 11/1999 | Bourget | |
| 6,412,856 B1 * | 7/2002 | Kajikawa et al. | 296/203.01 |
| 6,702,058 B2 * | 3/2004 | Ishii et al. | 180/311 |
| 6,846,018 B2 | 1/2005 | Dennert et al. | |
| 7,311,167 B2 | 12/2007 | Takayanagi et al. | |
| 7,350,881 B2 | 4/2008 | Asahi | |
| 7,434,822 B2 * | 10/2008 | Takahashi et al. | 280/124.109 |
| 7,618,063 B2 * | 11/2009 | Takeshima et al. | 280/785 |
| 7,832,766 B2 * | 11/2010 | Kudo | 280/785 |
| 8,851,496 B2 * | 10/2014 | Hedtke | 280/281.1 |
| 2004/0129483 A1 * | 7/2004 | Girouard et al. | 180/311 |
| 2008/0007042 A1 | 1/2008 | Yamasaki | |
| 2008/0083801 A1 | 4/2008 | Knoch et al. | |
| 2008/0110688 A1 | 5/2008 | Miyashiro et al. | |
| 2008/0156570 A1 | 7/2008 | Minami et al. | |
| 2009/0107753 A1 | 4/2009 | Doperalski et al. | |
| 2009/0194354 A1 | 8/2009 | Kubo et al. | |

* cited by examiner

*Primary Examiner* — Toan To

(74) *Attorney, Agent, or Firm* — Goodhue, Coleman & Owens, P.C.

(57) ABSTRACT

A sub-frame and component configuration for mounting on a motorcycle include a body frame structure including a main frame portion; and a sub-frame portion, he sub-frame is fixedly secured to the main frame portion and is configured for receiving and securing thereon a drop seat providing a rider with a seating area that is relatively closer to the ground than the seating area of a conventional motorcycle seat. A method of mounting the sub-frame on a motorcycle includes: fixedly securing a drop seat sub-frame portion onto a main frame portion, wherein the drop seat sub-frame portion is configured for receiving and securing thereon a drop seat.

19 Claims, 23 Drawing Sheets

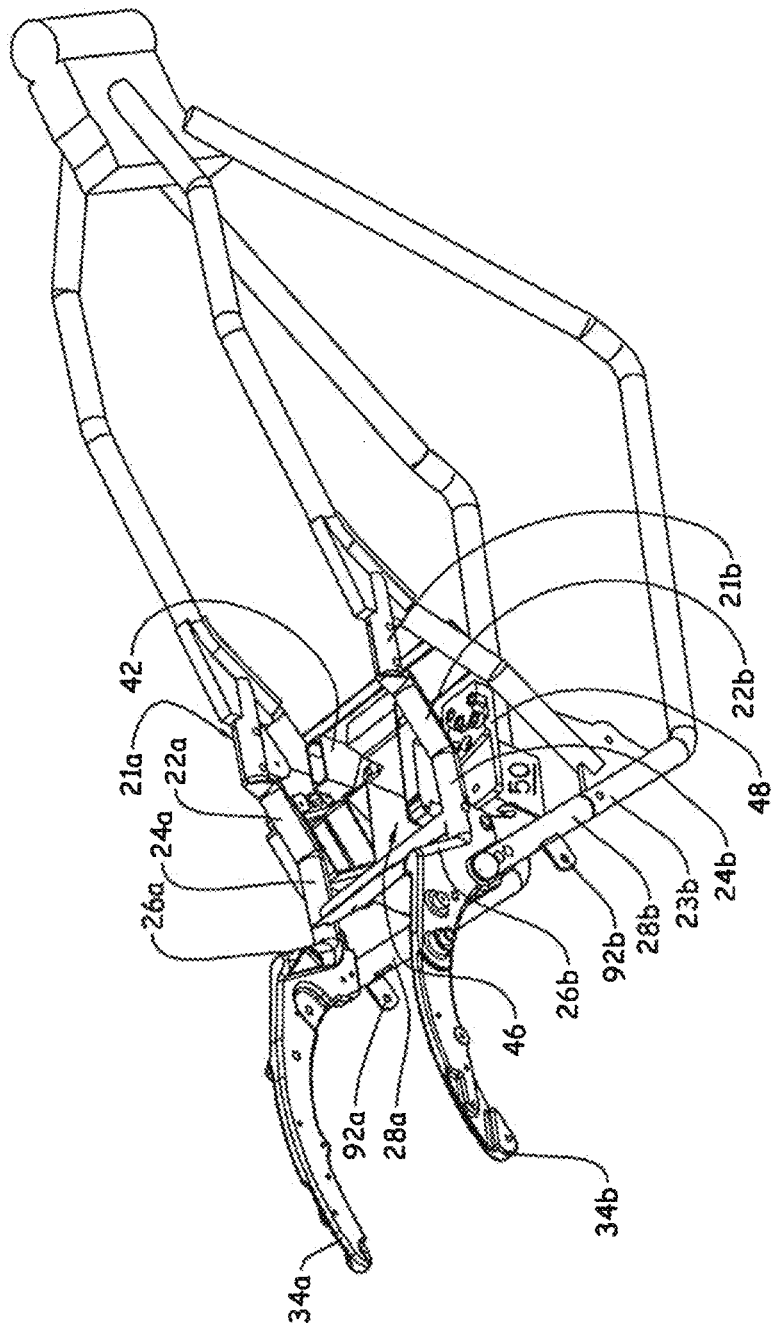

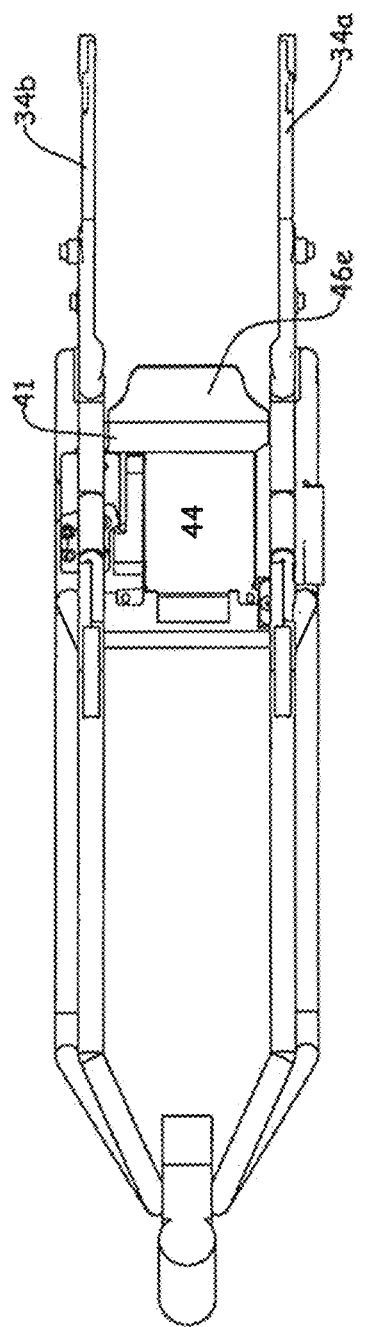
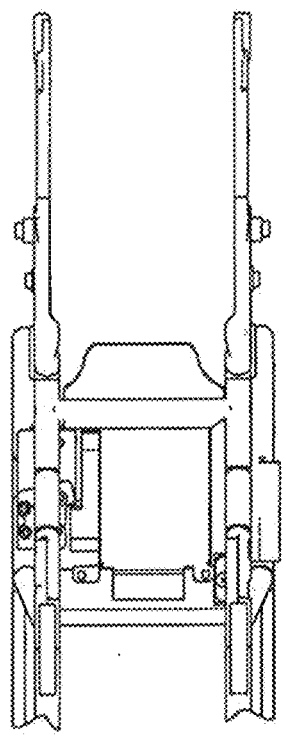
Fig. 8a
Fig. 8b

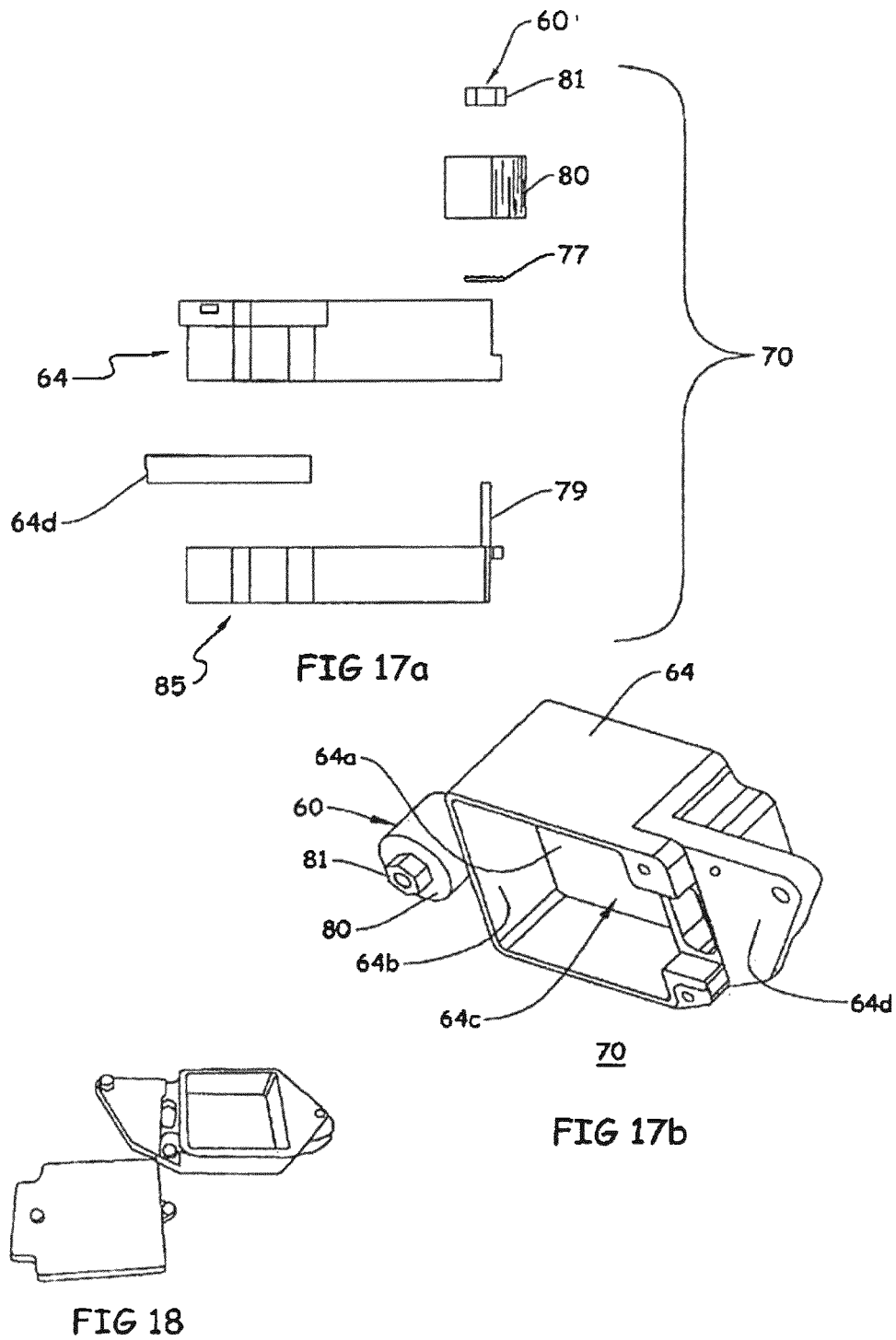

SUB-FRAME AND COMPONENT CONFIGURATION FOR MOUNTING OF A MOTORCYCLE DROP SEAT

CROSS-REFERENCE TO RELATED APPLICATIONS

This is a Continuation Application of U.S. Ser. No. 12/804,626 filed Jul. 26, 2010, which application claims priority to under 35 U.S.C. §119 U.S. Provisional Application U.S. Ser. No. 61/271,697 filed Jul. 25, 2009, herein incorporated by reference in their entirety.

BACKGROUND OF THE INVENTION

The embodiments of the present invention relate to a novel sub-frame structure for a motorcycle and to a novel spatial arrangement of motorcycle components within a cavity partially defined by the sub-frame.

SUMMARY OF THE INVENTION

A sub-frame and component configuration for mounting on a motorcycle includes a body frame structure including a main frame portion; and a sub-frame portion, he sub-frame is fixedly secured to the main frame portion and is configured for receiving and securing thereon a drop seat providing a rider with a seating area that is relatively closer to the ground than the seating area of a conventional motorcycle seat A method of mounting the sub-frame on a motorcycle is provided and includes: fixedly securing a drop seat sub-frame portion onto a main frame portion, wherein the drop seat sub-frame portion is configured for receiving and securing thereon a drop seat.

BRIEF DESCRIPTION OF THE DRAWINGS

FIG. 7a illustrates a right perspective view of a body frame structure in accordance with an embodiment of the invention.

FIG. 7b illustrates an exploded assembly view of the body frame structure shown in FIG. 7a.

FIG. 8a illustrates a top view of a body frame structure of a motorcycle in accordance with an embodiment of the invention.

FIG. 8b illustrates a detailed view of a sub-frame portion of the body frame structure shown in FIG. 8a in accordance with an embodiment of the invention.

FIG. 13a illustrates a right side elevational view of a new sub-frame portion in accordance with an embodiment of the invention.

FIG. 17a illustrates a side elevational view of a fuse box retainer and retainer wheel assembly in accordance with an embodiment of the invention.

FIG. 17b illustrates a perspective view of the fuse box retainer and retainer wheel assembly shown in FIG. 17a.

FIG. 18 illustrates a fuse box retainer assembly including a fuse box retainer and cover in accordance with an embodiment of the invention.

DETAILED DESCRIPTION

The present invention generally relates to a sub-frame and component configuration for mounting of a motorcycle drop seat that provides a safe footing for a rider to ride a motorcycle. Like elements are referred to with like reference numbers throughout. Additionally, reference to "right" and "left" is referenced from a rider on a motorcycle. A conventional motorcycle seat and conventional stock sub frame as referenced herein includes seats that are seated on a stock sub frame, similar to the stock sub frame 20b' shown in FIG. 3, that has an upper tubular or support member having a first end attached to a main frame and extends across the sub frame along a horizontal plane to terminate at a second end extending to a rear section of a fender support frame shown to the rear of FIG. 3.

Figure 1:
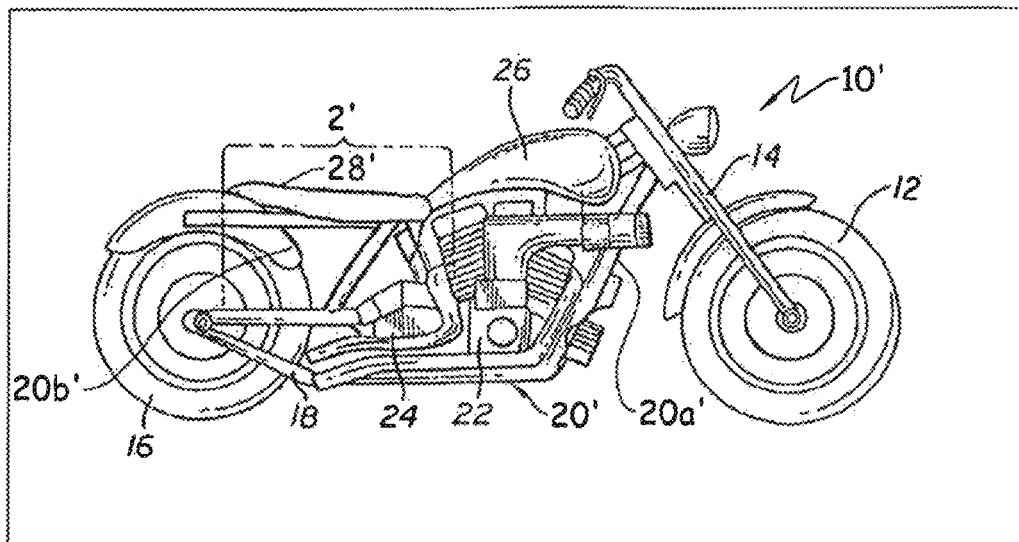
FIG. 1 illustrates a left side elevational view of a motorcycle including a conventional body frame structure with a conventional seat.
Figure 2:
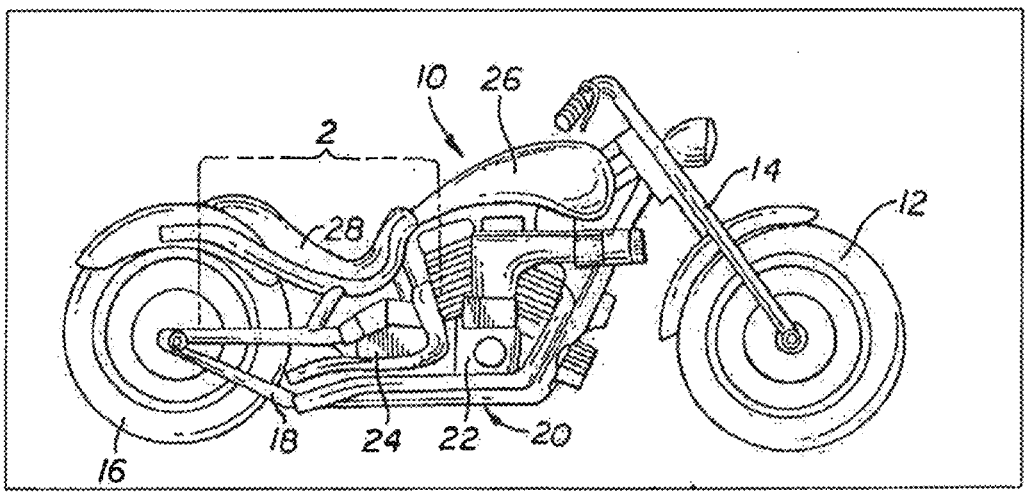
FIG. 2 illustrates a left side elevational view of a motorcycle including a modified body frame structure with a configuration that accommodates a seat that is lower than a conventional seat in accordance with an embodiment of the invention.
Figure 3:
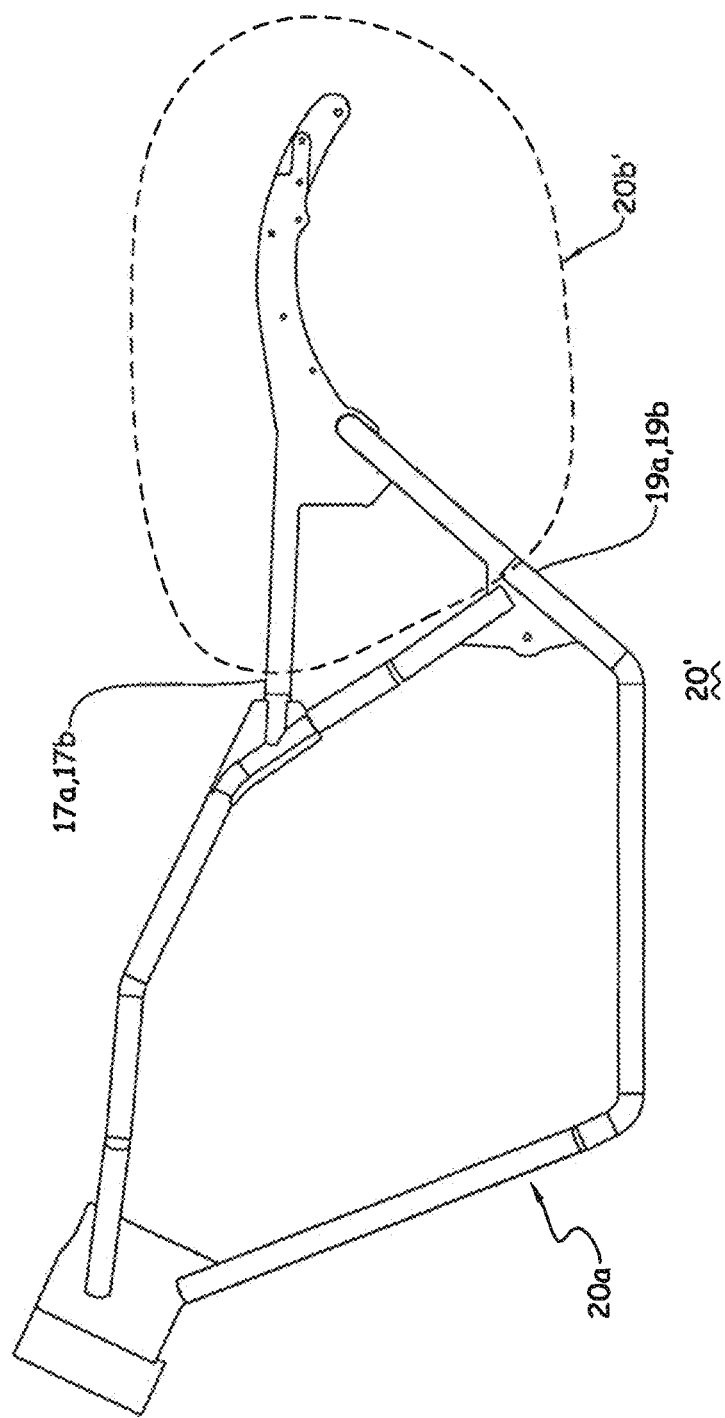
FIG. 3 illustrates a detailed view of the encircled portion 2' denoted by a dashed line shown in FIG. 1.
Figure 4:
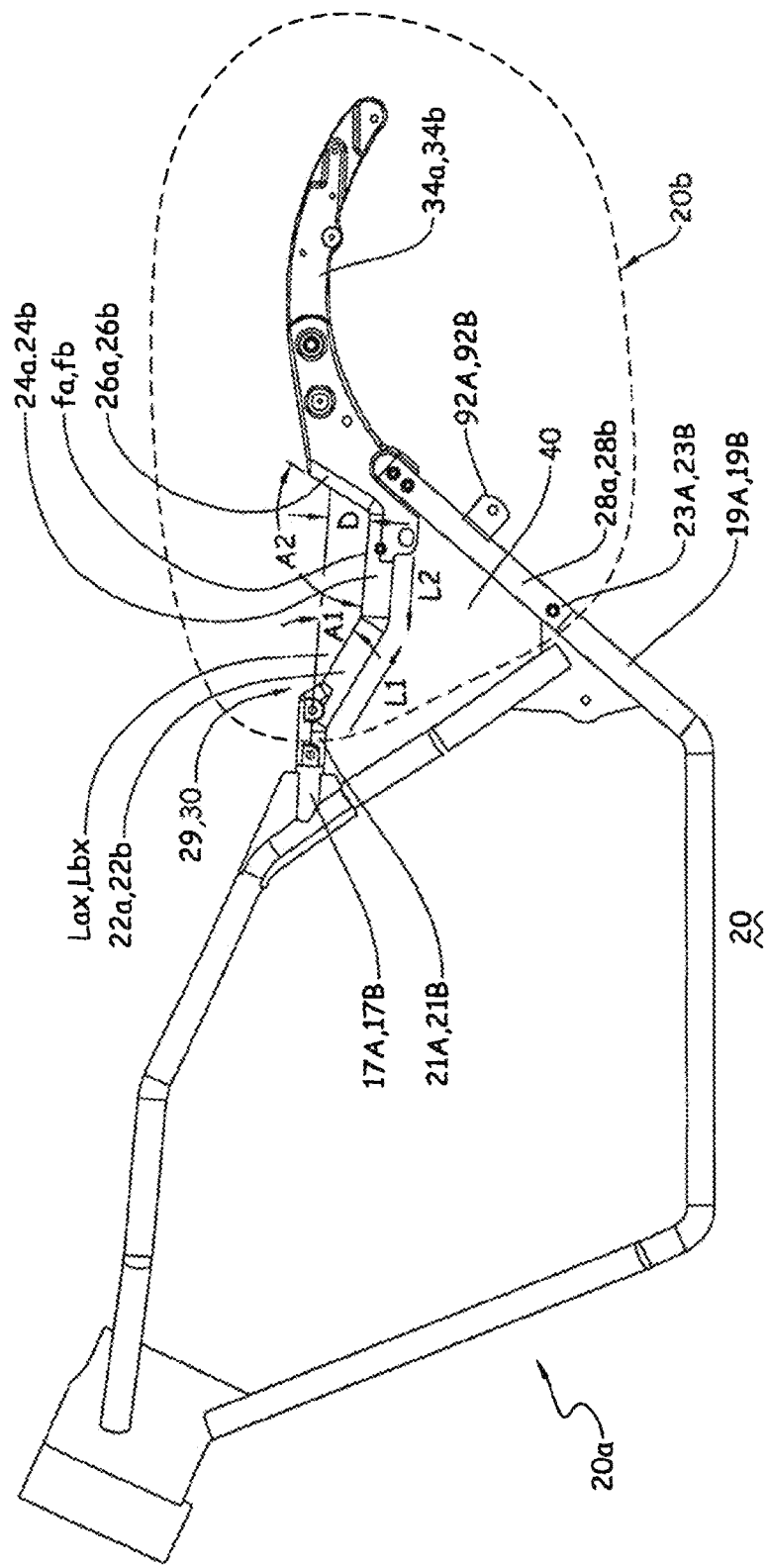
FIG. 4 illustrates a detailed view of the encircled portion 2 denoted by a dashed line shown in FIG. 2 in accordance with an embodiment of the invention.

Referring to the drawings, in particular, FIGS. 1 and 2 illustrate a left side elevational view of a motorcycle 10, 10', respectively. FIGS. 3 and 4 illustrate a detailed view of the encircled portion 2' and 2 denoted by a dashed line shown in FIGS. 1 and 2 respectively. The conventional stock sub frame 20b' shown in FIG. 3 has an upper tubular or support member having a first end attached to a main frame and extends linearly and substantially coaxially with a longitudinal axis of a top mounting portion of the main frame where the stock sub frame 20b' attaches to the main frame 20a across the sub frame continuously along a substantially horizontal plane to terminate at a second end, wherein the second end terminates at a rear section of the sub frame 20b' proximate to the fender support frame. There is no drop in height of the upper tubular or support member defining a gap or distance between the top mounting portion of the main frame and the upper tubular or support member throughout the length between the first end and the second end of the tubular stock sub-frame 20b' member.

As seen in FIGS. 1 and 3, a conventional motorcycle seat is 28' mounted to a conventional sub-frame 20b' which is attached to an associated main frame portion 20a to form a body frame structure 20' shown in more detail in FIG. 3. Motorcycle 10' includes a body frame structure 20', a front fork 14 connected to the body frame 20', and a front wheel 12 supported by a front fork 14. Body frame structure 20' also supports motor 22, transmission 24, gas tank 26, and a conventional seat 28' and various other elements (for example, a battery, ABS module, ECM module, ignition cables, etc.) which may be necessary or desirable for operation of the motorcycle. A rear wheel 16 is also connected to the body frame structure 20' via a swing arm frame 18 or other, similar mechanism.

FIGS. 2 and 4 illustrate a motorcycle, designated generally by reference numeral 10, incorporating a sub-frame structure and associated elements in accordance with an embodiment of the present invention. Motorcycle 10 includes a body frame structure 20, a front fork 14 connected to the body frame 20, and a front wheel 12 supported by a front fork 14. Body frame structure 20 in FIG. 4 supports motor 22, transmission 24, gas tank 26, and a "drop seat" 28 and various other elements (for example, a battery, ABS module, ECM module, ignition cables, etc.) which may be necessary or desirable for operation of the motorcycle. A rear wheel 16 is also connected to the body frame structure via a swing arm frame 18 or other, similar mechanism.

A body frame structure 20 in accordance with embodiments of the present invention includes a conventional or stock main frame portion 20a and a specially-designed sub-frame portion 20b in accordance with embodiments of the present invention. In one embodiment, sub-frame portion 20b (described in greater detail below) is a separate part and is configured for attachment to main frame portion 20a using any suitable method, for example, bolts or welds. Alternatively, sub-frame portion 20b may be formed integrally with main frame portion 20a. Sub-frame portion 20b is also configured for receiving and securing thereon a "drop seat" 28, shown in FIG. 1, providing a rider with a seating area that is relatively closer to the ground than the seating area of a conventional seat.

Referring to FIGS. 4, 6, 7a, 7b, 9-10, 13a, 13b, sub-frame portion 20b includes a pair of opposed first portions 25a, 25b configured for attachment to main frame portion 20a at a respective opposing main frame top mount 17a, 17b. In an embodiment of the invention, as shown in more detail in FIG. 4, the first portions 25a, 25b each have a first segment mounting portion 21a, 21b that each attaches to respective opposing main frame mounts 17a, 17b and are each in longitudinal alignment with a respective longitudinal axis Lax, Lbx of each-associated main frame top mounts 17a, 17b and further attach to a respective second .segment portion 22a, 22b, each having a predefined length La1, Lb1.

The second segment portions 22a, 22b each form a predefined angle A1 downwardly from each of the longitudinal axes Lax, Lbx of the main frame top mount 17a, 17b. A pair of opposed second portions 24a, 24b each having a predefined length La2, Lb2 are connected to respective second segment portions 22a, 22b of the opposed first portions 25a, 25b, wherein the second portions 24a, 24b are each respectively located a predefined distance, D below the longitudinal axes Lax, Lbx of the mainframe top mounts 17a, 17b to a respective point fa, fb on the second portions 24a, 24b. In an embodiment of the invention shown in FIG. 4, the distance D is about three inches between the longitudinal axes Lax, Lbx of the main frame top mounts 17a, 17b to the respective points fa, fb on the second portions 24a, 24b. However, the distance D may be adjustable based on the configuration of the first and second portions with respect to the main frame top mounts 17a, 17b, in particular, the distance D varies in accordance with the following variables: angle A1 formed between the second segment portions 22a, 22b and each respective one of the longitudinal axes Lax, Lbx of the main frame top mount 17a, 17b; the predefined lengths La1, Lb1 of the second segment portions 22a, 22b, and the predefined lengths La2, Lb2 of the second portions 24a, 24b.

As shown in FIGS. 4, 6, 7a, 7b, 9 (right sub-frame), 10 (left sub-frame); 13a, 13b a pair of opposed third portions 26a, 26b are connected to respective ones of the opposed second portions 24a, 24b and extend upwardly at a predefined angle A2 from each of the opposed second portions 24a, 24b, respectively. First portion 25a, second portion 24a, and third portion 26a combine to form a left sub-frame portion 29 (shown in FIGS. 4, 6, 10, and 13a) of the motorcycle, and first portion 25b, second portion 24b, and third portion 26b combine to form a right sub-frame portion 30 (shown in FIGS. 4, 7a, 9, and 13b) of the motorcycle.

The frame portions comprising the elements of left and right sub-frame portions 29 and 30 may be connected using any suitable method. In one particular embodiment, one or more of left and right sub-frame portions 29 and 30 is formed from a single bar or piece of tubing which is bent to provide the configuration shown in FIGS. 4, 6, 7a, 8a, 8b, 9-12, 13a, 13b. Alternatively, the constituent elements of one or more of left and right sub-frame portions 29 and 30 may be welded together or otherwise suitable connected.

Figure 5:
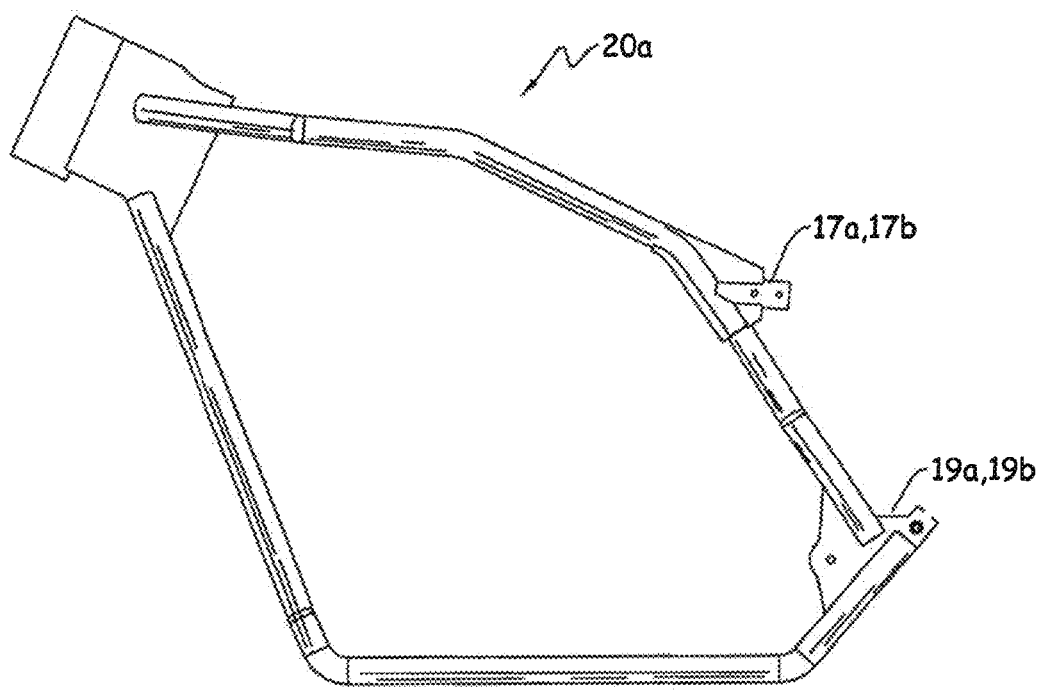
FIG. 5 illustrates a left side elevational view of a main frame of a motorcycle not attached to a sub-frame.
Figure 6:
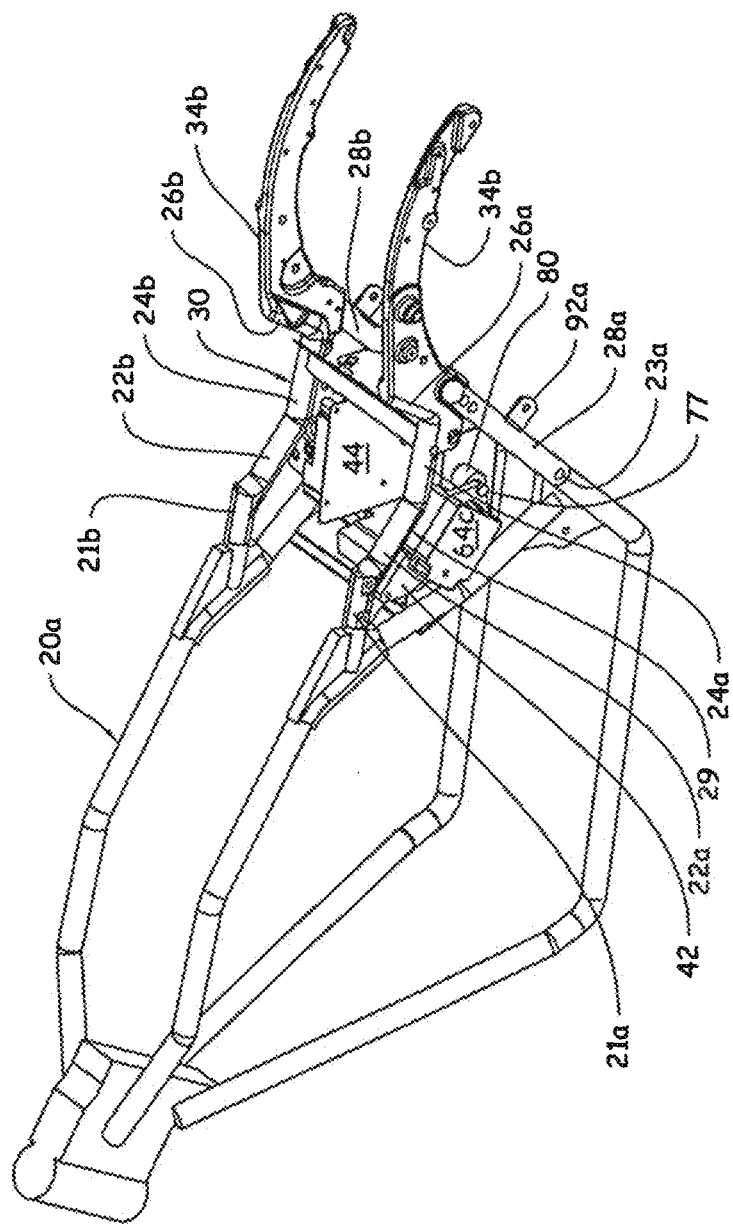
FIG. 6 illustrates a left perspective view of a body frame structure in accordance with an embodiment of the invention.

FIG. 5 illustrates stock main frame portion 20a not attached to the subframe portion 20b.

As seen in FIG. 4, the constituent elements of each of left and right subframe portions 29 and 30 are angled with respect to each other so as to define a depression or receptacle 32 suitable for receiving a portion of the motorcycle drop seat therein. In addition, a pair of opposed fourth portions 28a, 28b are configured for attachment to main frame portion 20a as shown in FIGS. 4, 6-7a, and 7b at bottom main frame mount 19a, 19b. As seen in FIGS. 4, 6-7a, 7b, 9-10, 13a, 13b third portions 26a, 26b and fourth portions 28a, 28b are connected to respective ones of a pair of opposed fifth portions 34a, 34b, using bolts, welds, or any other suitable means. In the embodiment shown in FIGS. 4, 6, 7a, 7b, 9-10, 13a, and 13b, fifth portions 34a, 34b serve as fender braces for the rear fender of the motorcycle.

In a conventional motorcycle, numerous operational components of the motorcycle are positioned within a cavity residing under the motorcycle seat and defined by portions of the motorcycle body frame. In a frame incorporating a drop seat sub-frame in accordance with embodiments of the present invention, the cavity defined by the body frame is smaller than the cavity defined by a body frame using a conventional seat and sub-frame.

As described below, in the embodiments of the present invention, novel hardware components are utilized to enable a novel spatial arrangement of the operational components within the cavity defined by the drop seat sub-frame. This novel spatial arrangement facilitates incorporation of sub-frame portion 20b into the motorcycle frame by enabling the components to fit within the smaller cavity defined partially by the drop seat sub-frame.

As seen in FIGS. 4, 6, 7a, 7b, 8a, 8b, 9-10, 13a, 13b, left and right subframe portions 29 and 30, fourth portions 28a, 28b, and fifth portions 34a, 34b combine to define a cavity 40 in which various operational components of the motorcycle are received and secured, in a manner described in greater detail below. A cross-over tube 41 (see FIG. 8) extends between opposed fourth portions 28a and 28b. Sub-frame portion 20b provides support and mounting points for the rear fender, shock absorbers, drop seat, tour packs, battery box, and other accessories that attach to the rear of the motorcycle. As described herein, sub-frame portion 20b is configured for attachment to any of a variety of stock or existing main frame portions. The bars or tubing forming left and right sub-frame portions 29 and 30 may have any suitable cross-sectional shapes and dimensions and may be formed from steel, aluminum, or any other suitable material.

FIGS. 19a, 19b, and 20-46 details attachment of a sub-frame 20b in accordance with embodiments of the present invention to a conventional main frame portion 20a.

Reference to FIGS. 19a, 19b, and 20-46 also describes detachment of operational components of the motorcycle from a conventional motorcycle body frame, and the rotation and/or repositioning and securement of the components within a cavity formed by main frame portion 20a and sub-frame portion 20b, in accordance with embodiments of the present invention.

Turn Signal Module

Figure 27:
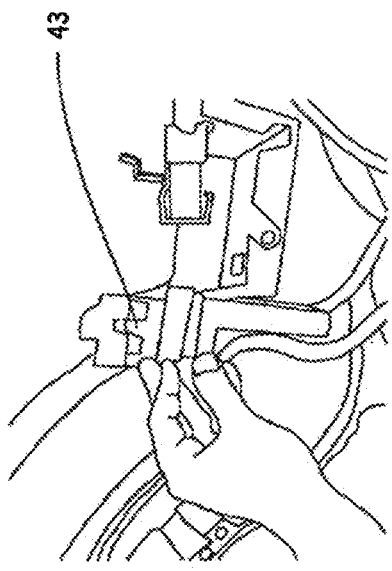
Figure 29:
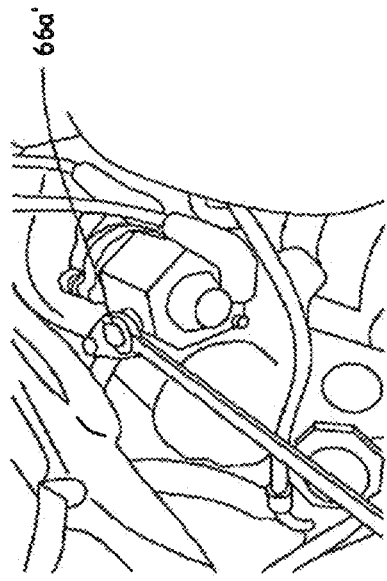
Figure 35:
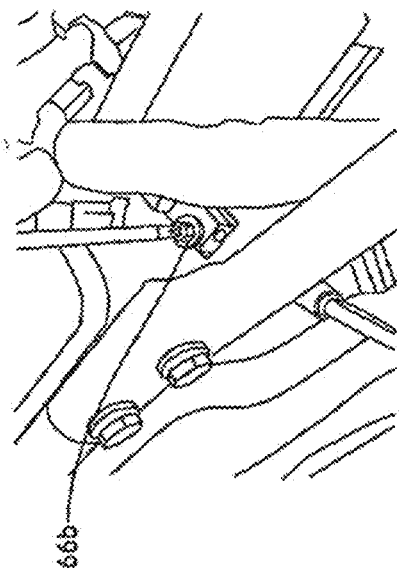
Figure 36:
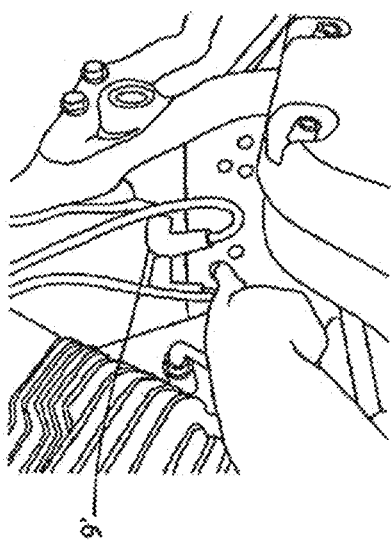
Figure 37:
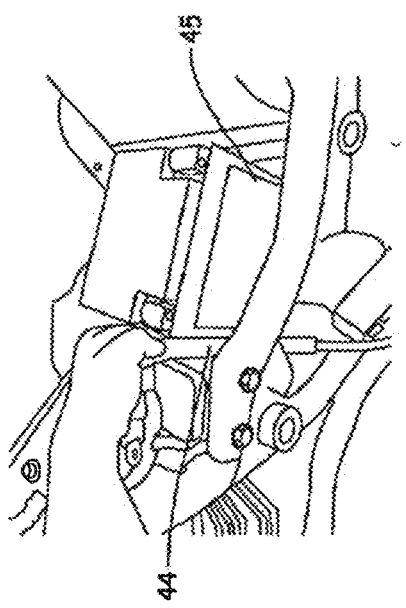
Figure 39:
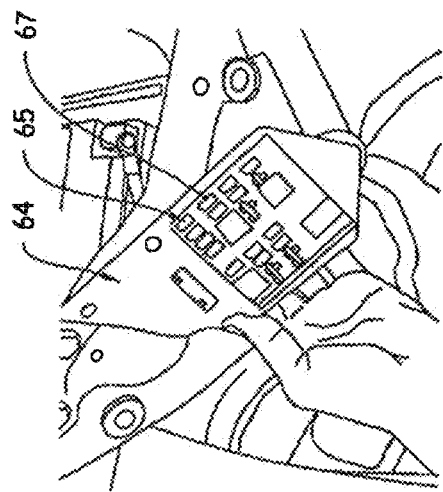
Figure 41:
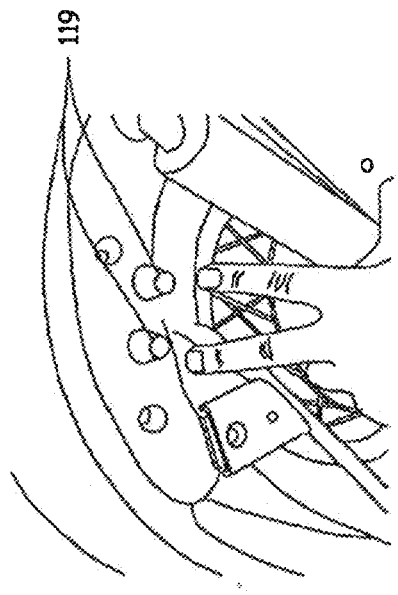
Figure 38:
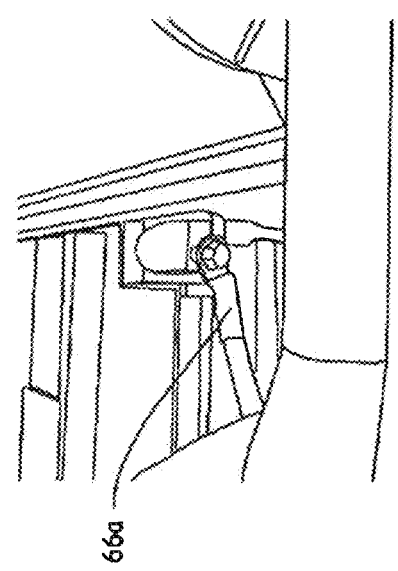
Figure 40:
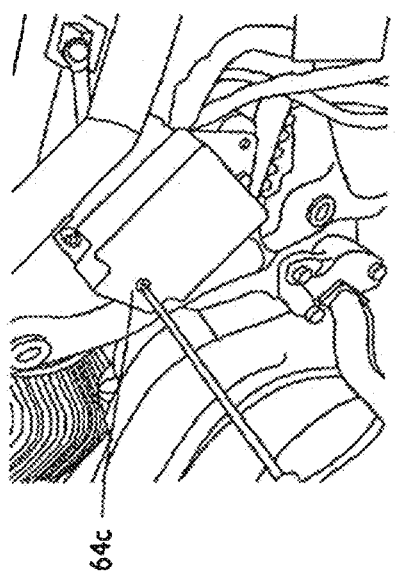

Referring to the FIGS. 6, 7a, 7b, 8b, and FIGS. 27 and 35, in a component spatial arrangement in accordance with one embodiment of the present invention, a turn signal module mount 42 is configured for receiving therein a known turn signal module 43 (shown in FIGS. 27 and 35 to enable selective positioning of the turn signal module 43 within cavity 40. In the conventional motorcycle described above, the turn signal module 43 is mounted in a stock battery box 46' (shown in FIG. 28). In the embodiments described herein, turn signal module mount 42 defines an enclosure within which the turn signal module is positioned and secured using any suitable method.

As described in FIG. 27, during installation of sub-frame 20b and repositioning of the motorcycle components, the turn signal module 43 is removed from the stock battery box 46' that was installed in the motorcycle, and then secured within turn signal module mount 42. Turn signal module mount 42 is attached to a cross-member of body frame structure 20 using any of a variety of known methods, such as bolts, tie-wraps, or adhesives. In a particular embodiment turn signal module mount 42 is attached to cross-over tube 41. When the turn signal module 43 is secured in turn signal module mount 42, the module mount 42 provides the module with a degree of protection from dirt, oil, and other contaminants. Turn signal module mount 42 may be formed from a metallic material, a polymer material, or any other suitable material or combination of materials.

Battery Box Assembly

Referring now to the FIGS. 6, 7a, 7b, 8a, 8b, 11-12, 13a, 14-16, 21, 34, and 36, a battery box assembly 44 includes a battery box 46, an ABS manifold 48, an ABS module 50, a battery 45 (shown in FIGS. 21 and 36), an ECM module 54, and an ignition coil 91 (shown in FIG. 34) and ignition module 90. Battery box 46 is configured to hold a motorcycle battery and to provide mounting points for ECM module 54, ABS module 50, and the ignition coil 91 and ignition module 9. Battery box 46 includes a substantially rectangular base 46a and two pairs of opposed walls 46b and 46c projecting from base 46a to define an enclosure 46d. An angled portion 46e projects from one of walls 46c. Battery box 46 is attached to a cross-member of body frame 20 and also to cross-over tube 41 using any suitable method, for example bolts, tie-wraps, or adhesive attachment. In the embodiment shown in the drawings, battery box angled portion 46e is bolted to cross-over tube 41 to attach the battery box to sub-frame portion 20b. In an embodiment of the invention, a portion of battery box 46 (including angled portion 46e) is configured and positioned to serve as an extension of the motorcycle rear fender to aid in protecting the internal components of the motorcycle from road dust, spray, oil, and other contaminants.

Battery box 46 may be formed from a metallic material, a polymer material, or any other suitable material or combination of materials.

ABS Assembly

To accommodate installation of the drop seat on a motorcycle which includes an ABS braking system, the ABS control module 50 is removed from its location in the stock motorcycle and re-positioned within cavity 40. The ABS module is attached to battery box 46. Referring to FIGS. 7a, 7b, 15-16, and 43, ABS module 50 is attached to an exterior of battery box 46 using any suitable method, for example bolts, tie-wraps, or adhesive attachment. The ABS module 50 is a known module used for controlling an ABS braking system in the motorcycle. To accommodate installation of the drop seat on the motorcycle incorporating a sub-frame 20b in accordance with embodiments of the present invention, the ABS module 50 is also rotated approximately 180 degrees relative to its orientation in a conventional body frame, and then repositioned and secured farther toward the rear of the motorcycle.

An ABS manifold bracket 48 includes openings 48a extending therethrough to facilitate connection of the brake lines to the ABS module. Referring to FIGS. 7a, 7b, 15-16, and 43, ABS manifold bracket 48 is attached directly to the ABS module 50 using any suitable method, for example bolts, tie-wraps, or adhesive attachment. The ABS manifold bracket 48 enables re-routing of the motorcycle brake lines to the new location of the ABS module 50 and connection of the motorcycle brake lines to the re-located ABS module 50.

To re-position the ABS module 50, the brake lines entering the ABS module 50 in the factory motorcycle are removed from the ABS module 50. The ABS module 50 is then removed from the motorcycle frame and attached to battery box 46 using bolts or another suitable method. The ABS manifold bracket 48 is attached to the ABS module 50, and the-motorcycle brake lines are attached to the ABS manifold bracket 48, using bolts or another suitable method. The previously detached brake lines are then re-connected to the ABS module 50 through openings 49 in the ABS manifold bracket 48. Both the brake lines and the ABS manifold openings 49 are labeled to facilitate connection of each brake line to a proper associated receptacle in the ABS module. For example, in one embodiment, four brake lines are labeled "Fm", "MF", "R", and "JMR", and ABS manifold openings directed to associated connection points on the ABS module are also labeled "Fm", "MF", "R", and "MR". The end of the brake line labeled "Fm" is inserted into the ABS manifold opening labeled "Fm" and bolted in place to the ABS manifold. The same procedure is followed for the other brake lines. In a particular embodiment the brake lines are connected to the ABS module 50 and bolted in place to the ABS using specially-designed bolts.

ECM Module

FIGS. 7b, 8b, 9, 13b, 15-16,-19 and 42 refer to the configuration, removal and installation of ECM module 54. To accommodate installation of the drop seat on the motorcycle, the ECM module 54 is removed from its location in the stock motorcycle and re-positioned within cavity 40. In the-embodiment shown, ECM module 54 is attached to battery box 46 using bolts or another suitable method. The ECM module 54 is a stock or known electronic control module that was previously installed in the stock motorcycle 10'. In a particular embodiment, the ECM module 54 is bolted to the battery box using specially-designed bolts.

Figure 34:
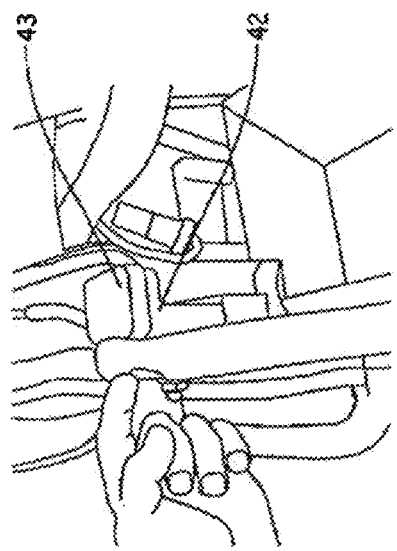

To accommodate installation of the drop seat on the motorcycle, the motorcycle ignition coil 91 is removed from its location in the stock motorcycle and repositioned within cavity 40 as shown in FIG. 34. In the embodiment shown in FIG. 34, the ignition coil is attached to battery box 46 using bolts or another suitable method. In a particular embodiment the ignition coil and ignition module 90 is bolted to the battery box 46 using specially-designed bolts.

Also, the ignition module 90 originally mounted on the motorcycle is repositioned and secured to the battery box 46. In a particular embodiment, the ignition module 90 is mounted to the rightmost side of the battery box 46, proximate the right side of the motorcycle.

Referring to FIGS. 31-32, 37-38 to accommodate repositioning of the components within the motorcycle frame structure, specially-designed extended length battery cables 66a, 66b (shown in FIG. 7b) are provided for connecting the battery 45 to the starter 104, electrical circuits, ground, and the ignition system.

Figure 7B:
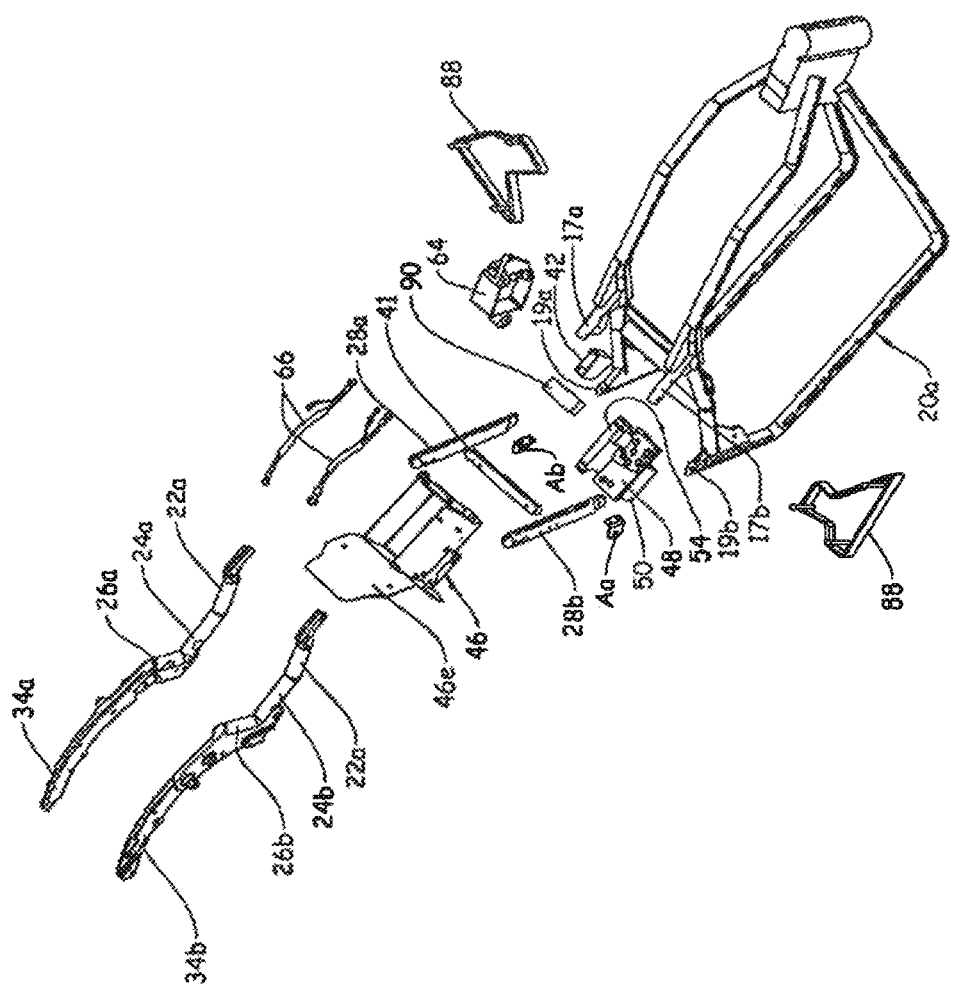
Figure 9:
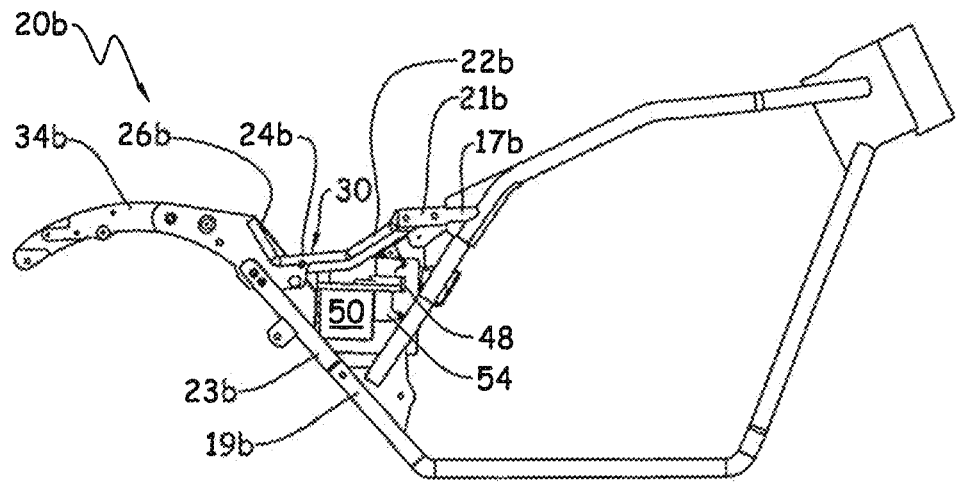
FIG. 9 illustrates a right side elevational view of the body structure frame shown in FIG. 8a in accordance with an embodiment of the invention.
Figure 10:
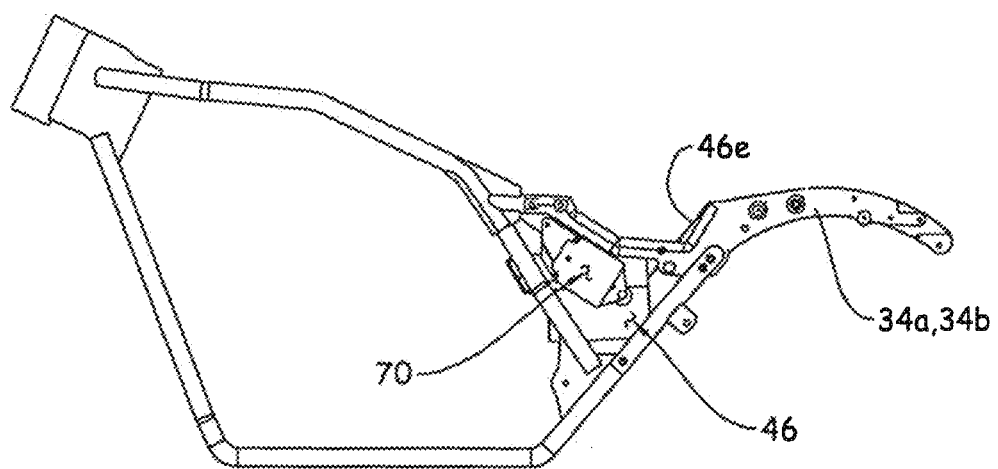
FIG. 10 illustrates a left side elevational view of the body structure frame shown in FIG. 8a in accordance with an embodiment of the invention.
Figure 12:
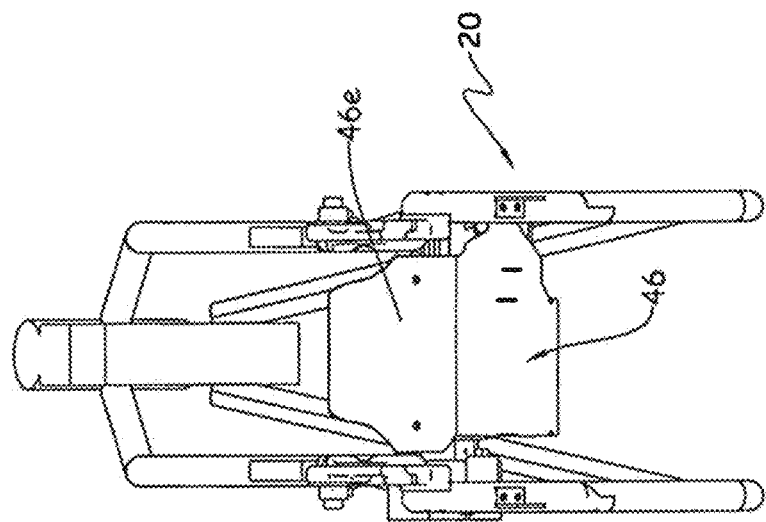
FIG. 12 illustrates a rear elevational view of the body structure frame shown in FIG. 8a in accordance with an embodiment of the invention.
Figure 11:
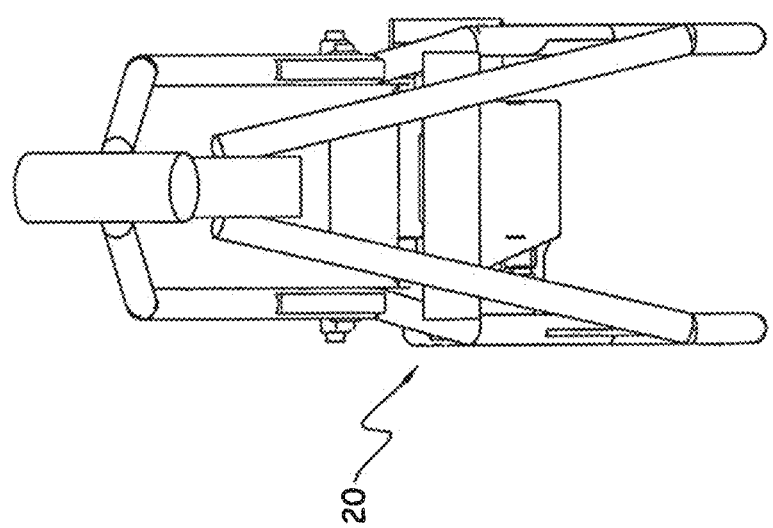
FIG. 11 illustrates a front elevational view of the body structure frame shown in FIG. 8a in accordance with an embodiment of the invention.
Figure 13A:
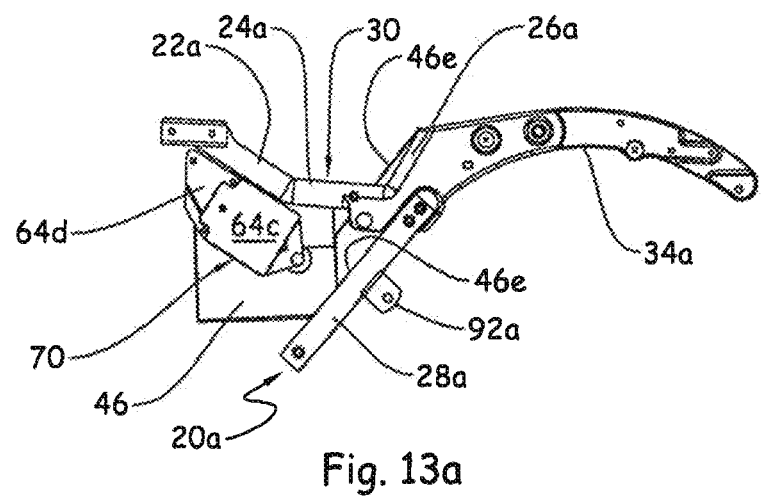
FIG. 13a illustrates a left side elevational view of a new sub-frame portion in accordance with an embodiment of the invention.
Figure 13B:
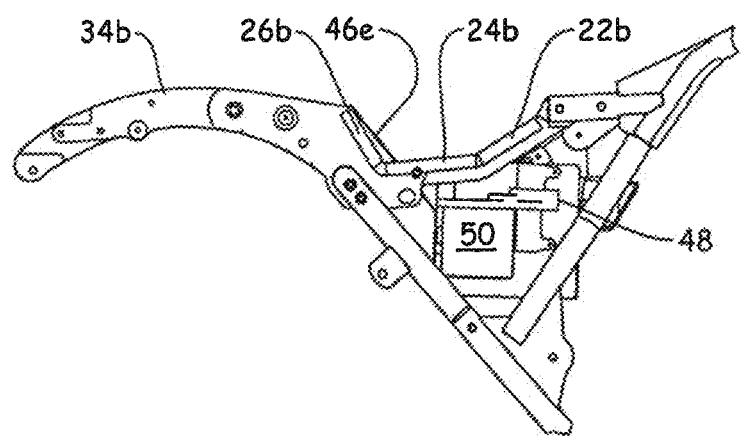
Figure 15:
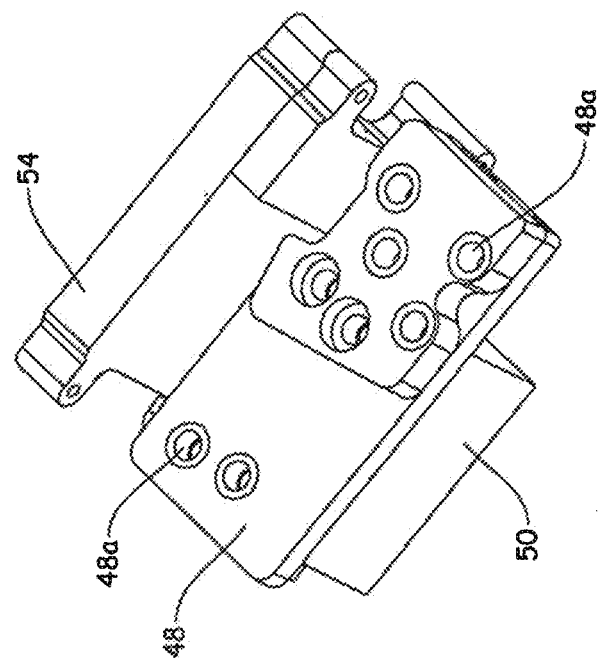
FIG. 15 illustrates a perspective view of an ABS manifold bracket, an ABS module, and an ECD module in accordance with an embodiment of the invention.
Figure 14:
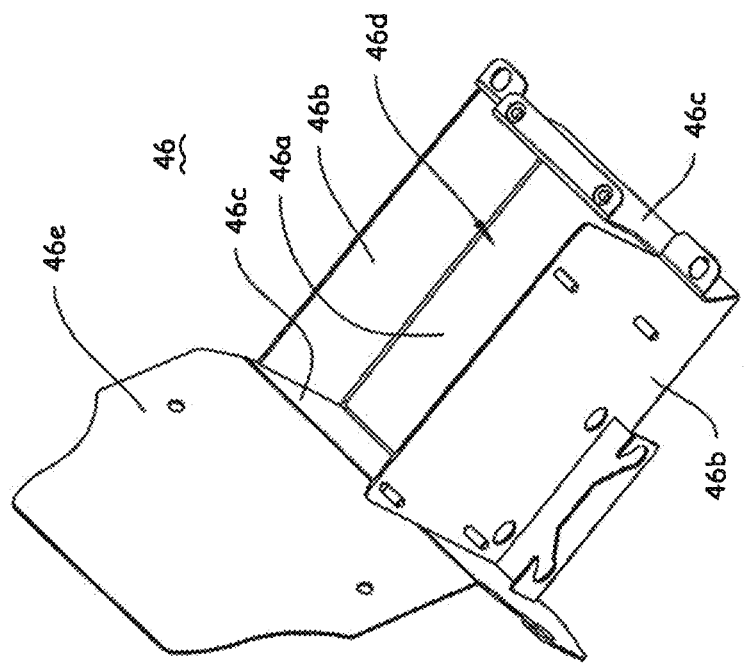
FIG. 14 illustrates a perspective view of a battery box in accordance with an embodiment of the invention.
Figure 16:
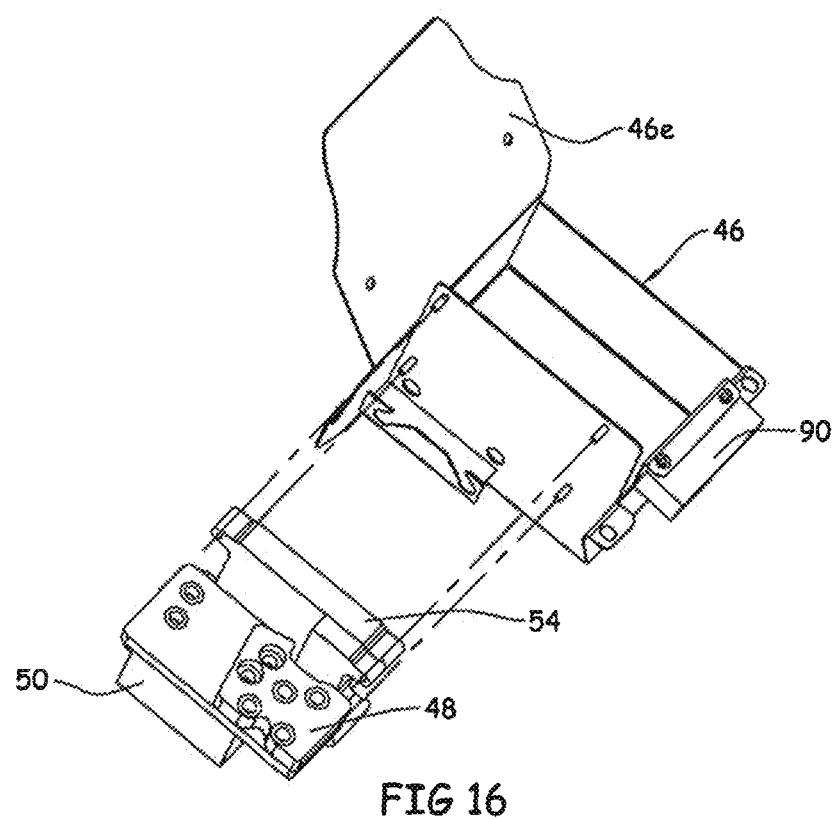
FIG. 16 illustrates an assembly view of the components shown in FIGS. 14 and 15 in accordance with an embodiment of the invention.
Figure 19:
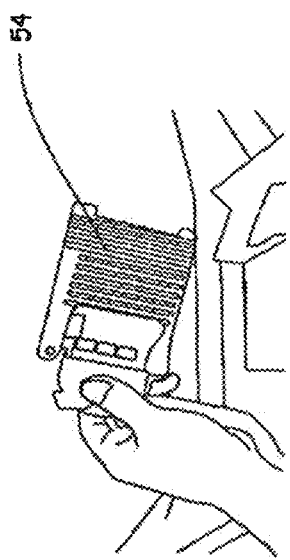
FIGS. 19-46 illustrate steps involved in detaching a conventional seat sub-frame and then attaching a drop seat sub-frame to a motorcycle body frame and in repositioning and securing various components to the motorcycle in accordance with an embodiment of the present invention.
Figure 21:
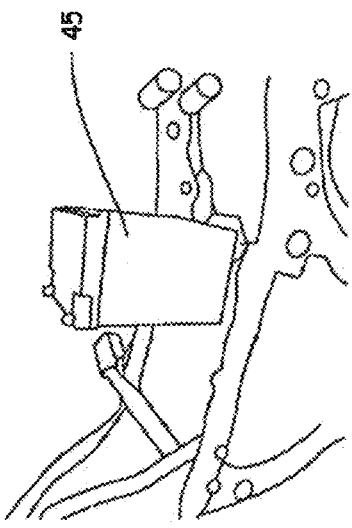
Figure 20:
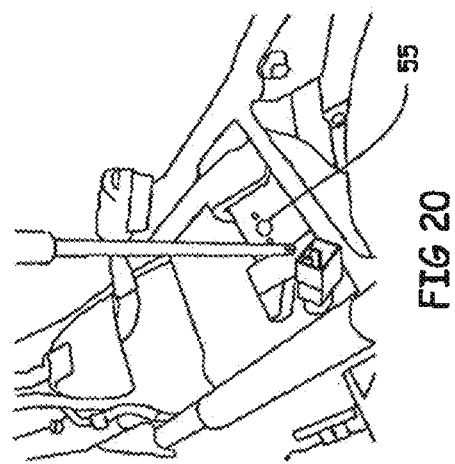
Figure 22:
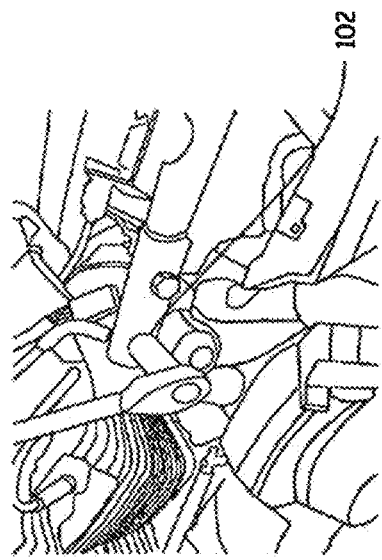
Figure 23:
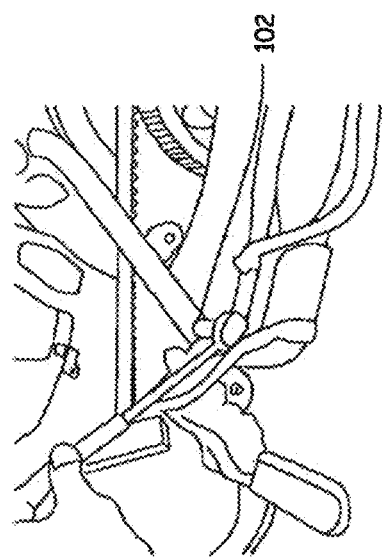
Figure 24:
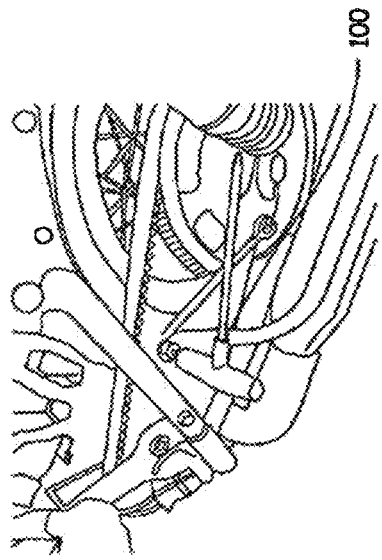
Figure 25:
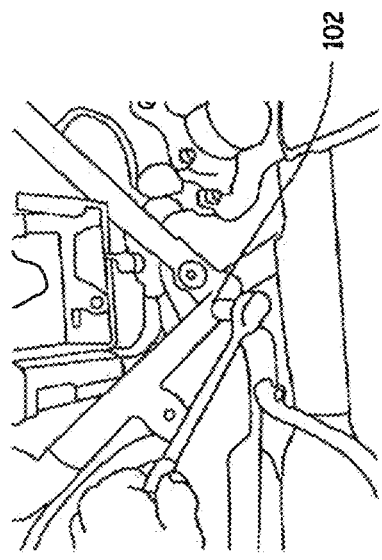

Referring to FIGS. 7b, 10, and 19a, to accommodate installation of the drop seat on the motorcycle, the fuse 67 (shown FIG. 19a) and fuse box retainer belt safety wheel assembly 76 built into the motorcycle are repositioned and incorporated into a fuse box assembly, generally designated 70. Fuse box assembly 70 includes a fuse box retainer 64, a fuse box retainer mounting bracket 64d (shown in FIG. 13a), a fuse box retainer cover 64c (shown in FIG. 13a, 18b), and the retainer box safety wheel assembly 76.

To facilitate relocation of the fuse holder 72, a fuse box retainer mounting bracket 64d (shown in FIG. 13a) is provided to furnish one or more mounting points for, an associated fuse box retainer 64 in which the fuse is located. The fuse box retainer mounting bracket 64d is attached to main frame portion 20a just below where the first segment mounting portion 21a of sub-frame 20b is attached to the main frame portion 20a, on the left side of the motorcycle. The fuse box retainer mounting bracket 64d is attached to main frame portion 20a using bolts or another suitable method.

Fuse box retainer 64 is attached to the fuse box retainer mounting bracket 64d using bolts or another suitable method. Fuse box retainer 64 includes a base 64a, a series of walls 64b projecting from the base to define an enclosure, and a mounting bracket 64d extending from one of walls 64b. The fuse 67 slides into fuse box retainer 64 and is held in place by a lip formed in the fuse box retainer.

The fuse box retainer 64 is also sized to receive therein a substantial portion of the motorcycle wiring harness connected to the fuses. Fuse box retainer 64 thus provides a relatively compact storage receptacle for a portion of the wiring harness, thereby freeing additional space within cavity 40 for other components.

A fuse box retainer cover 64c (shown in FIGS. 13a, 18, and 40) is secured to fuse box retainer 64 to cover enclosure 64c, thereby providing a substantially weather tight protective enclosure for the stock fuse box 72' residing within the fuse box retainer 64, to aid in preventing damage to the fuses. The fuse box retainer cover 64c is secured to fuse box retainer 64 using bolts or another suitable method.

Referring to FIGS. 5, 9, 13a, 17a, 17b, 18, 39-40, a fuse box retainer safety wheel assembly 60 installed on the production motorcycle is removed from its original location on the motorcycle and is attached to fuse box retainer 64 on a side of the fuse box retainer 64 opposite the side to which the fuse box retainer mounting bracket 64d is attached. The fuse box retainer safety wheel assembly 60 is made up of a fuse box safety retainer wheel 80 and associated hardware including a bolt 79, a washer 77 and nut 81 for attaching the wheel 80 to the fuse box retainer 64. In one embodiment, the wheel 80 is attached to the fuse box retainer 64 on a side of the fuse box retainer 64 opposite the side along which the fuse box retainer mounting 64 is attached to the fuse box retainer mounting bracket 64. Wheel 80 engages an associated drive belt (not shown).

The original function of fuse box retainer safety wheel assembly 60 is to serve as a belt tensioner for the drive belt. However, as repositioned in the embodiments of the present invention, assembly 60 serves as a belt tensioner and also as a spacing mechanism to aid in preventing contact between the belt 82 and fuse box retainer assembly 70.

Referring to FIG. 7b, a pair of side covers 88a, 88b is provided to enclose cavity 40 and adjacent portions of the motorcycle frame after installation of sub-frame 20b and installation and repositioning of the motorcycle internal components as described herein. Side covers 88a, 88b are specially configured for attachment to a body frame 20 incorporating sub-frame 20b and are designed to protect the internal components of the motorcycle from weather and road debris. Side covers 88 may be attached to the motorcycle frame using bolts or any other suitable method.

FIGS. 19-46 details the sequence of steps performed to remove a factory sub-frame from body frame 20, to install the drop seat frame portion 20b, and to install and/or reposition and secure the operational components of the motorcycle as described above.

Figure 26:
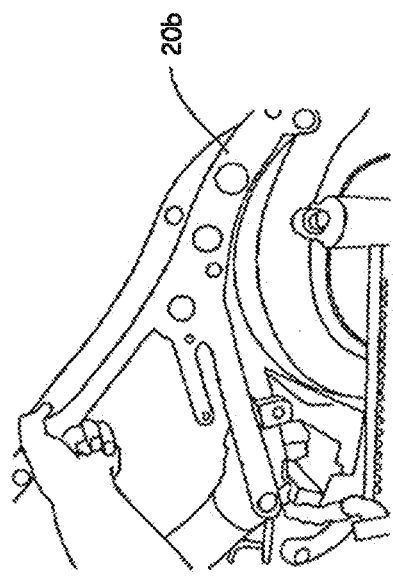
Figure 28:
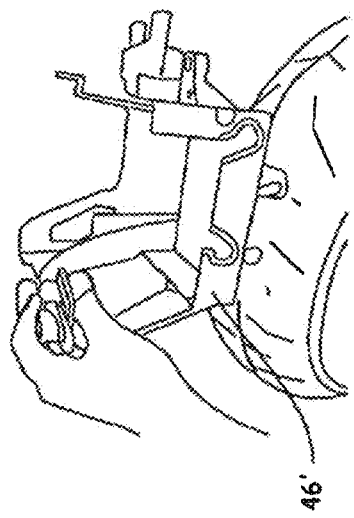

In an embodiment of the invention, a conventional sub-frame 20b' as is shown in more detail in FIG. 3 is removed from the stock main frame portion 20a by removing the following stock parts from the motorcycle 10 shown in FIG. 1: the conventional seat 28', which is replaced by the drop seat 28, shown in FIG. 1; side covers, which are replaced by new side covers 88a, 88b; saddlebags, which are reused; a seat strap, which may be reused, front saddlebag mounting brackets, which are reused; and an antenna, which is reused. Additionally, the following components are removed from the motorcycle 10 before installing the sub-frame portion 20b to form motorcycle 10' with the drop seat configuration as shown in FIG. 1: a fuse 67 from underneath a conventional fuse box retainer 64' (shown in FIG. 18), the conventional fuse cover box retainer 64' is replaced with a new fuse box retainer 64, an ECM 54 (shown in FIG. 19), which is reused, an ECM tray 55, which will not be reused (shown in FIG. 20); a battery 45, which is reused (shown in FIG. 21), saddlebag support bolts 100, which are reused (shown in FIG. 22); bolts 102 that hold the sub-frame 20b' to main frame 20a (shown in FIGS. 23-25). Finally, before installation of the new sub-frame portion 20b, the conventional sub-frame 20b' is removed from the motorcycle 10' as shown in FIG. 26. The following components are removed or relocated before the new sub-frame 20b is installed to form motorcycle 10 shown in FIG. 1: spark plug wires from the ignition coil; the turn signal module 43, which is relocated (shown in FIG. 27); the stock battery box 46', which will not be reused and which is removed from the. motorcycle (shown in FIG. 28); the battery cable 66a', which will not be reused, from the starter 104

Figure 30:
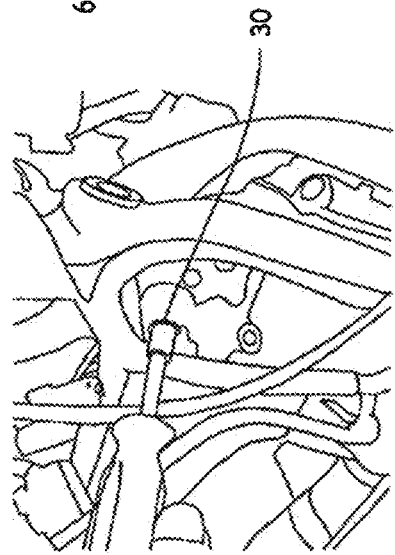
Figure 33:
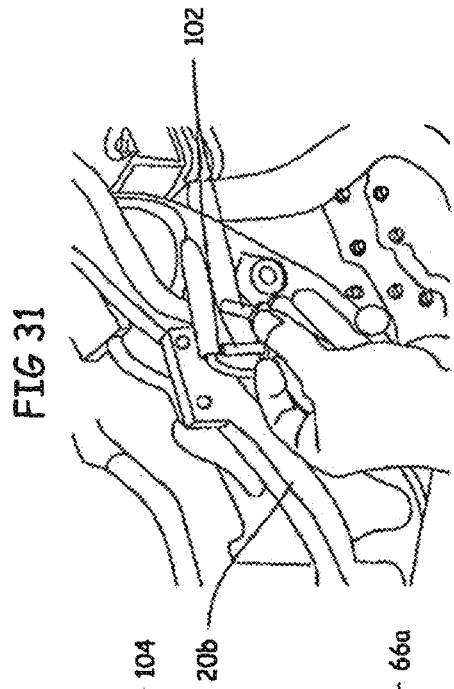

(shown in FIG. 29) and from the fuse plug-in; the ground cable 66b', which will not be used, from the frame 20 (shown in FIG. 30).

Figure 31:
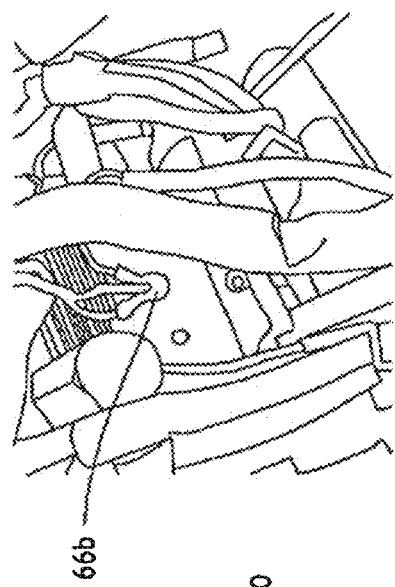
Figure 32:
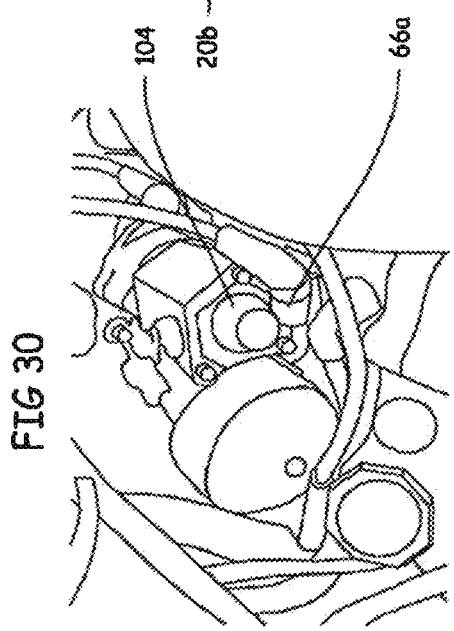
Figure 42:
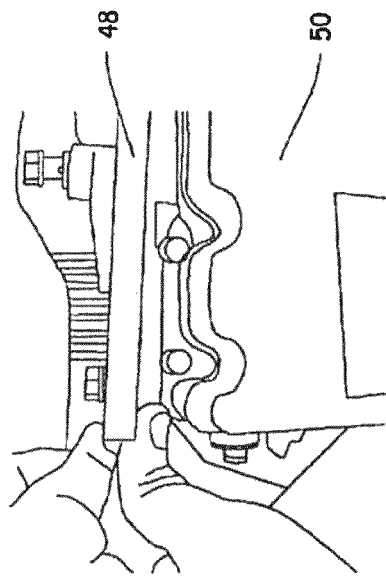
Figure 43:
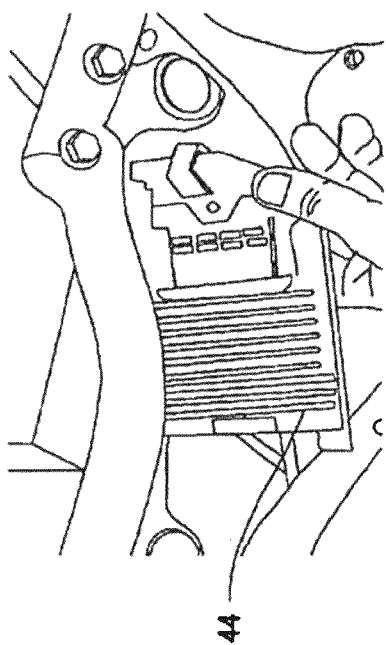
Figure 44:
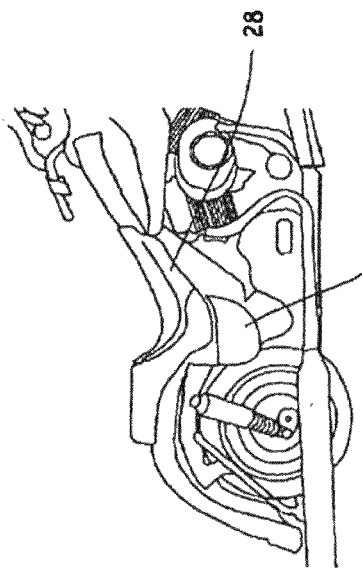
Figure 45:
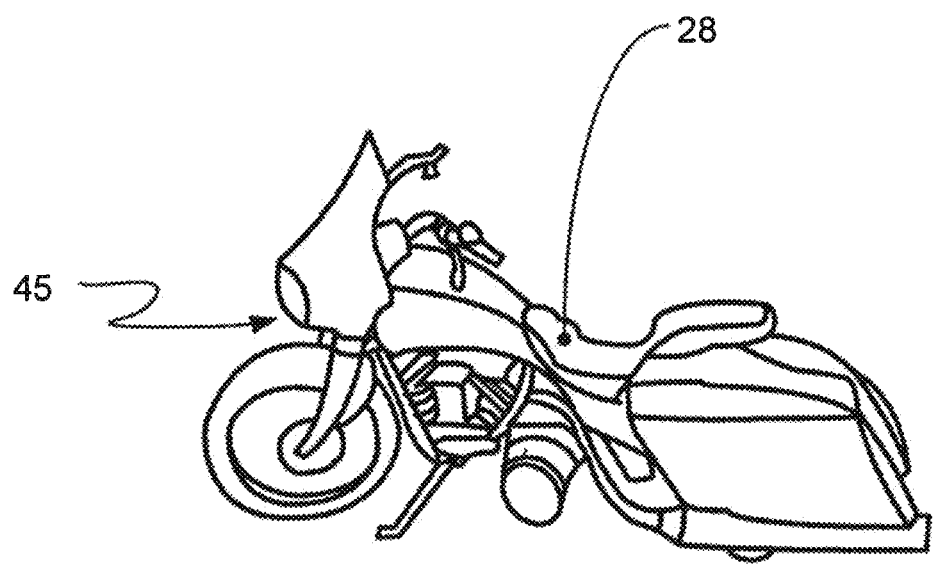
Figure 46:
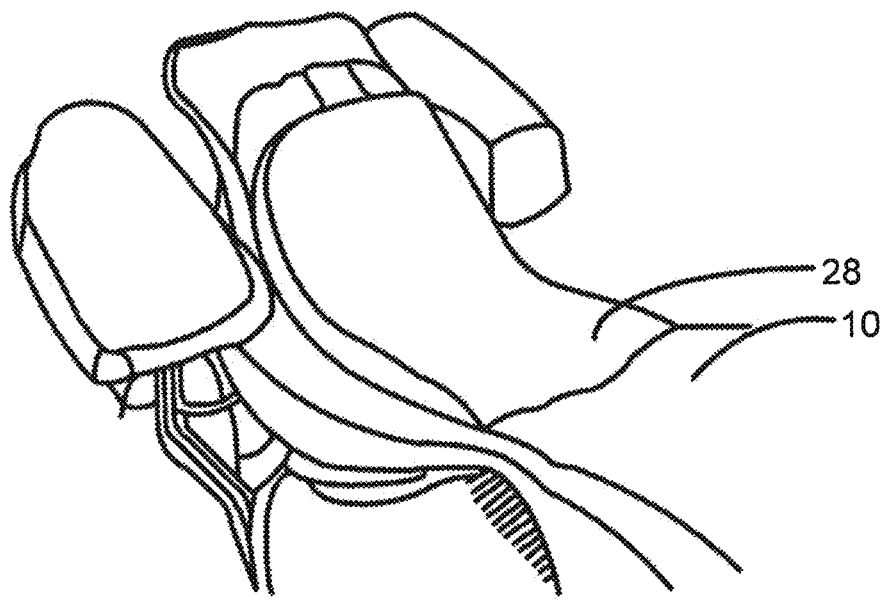

Once the afore-mentioned components are removed, or relocated, the following components are installed or relocated before installing the new sub-frame 20b: a new ground/battery cable 66b, which has a small wire that attaches to a stud (shown in FIGS. 31-32). Next, the new sub-frame 20b may be set into place on the motorcycle and connect to the main frame 20a by hand-starting the bolts 102 associated with the sub-frame 20b and then tightening with a suitable wrench. The bolts 102 may be color-coded to assure proper assembly. The following components are rerouted to fit within the associated new sub-frame components: fuse box wiring 65, the ignition coil 91 are received within a new battery box 46; the positive battery cable 66a is rerouted (FIG. 34); the stock turn signal module 43 is installed into a new turn signal module mount 42 so that the top of the turn signal module 43 is level with a top of the frame 20b (shown in FIG. 35); the battery 45 within the new battery box 46 (shown in FIG. 36); the ground cable 66b is connected to the battery 45 (shown in FIG. 37); a positive battery cable 66a is installed to a side-post of the battery 45 (shown in FIG. 38); the fuse holder 65 is installed into a new fuse box retainer assembly 64 and is mounted to the sub-frame 20b (shown in FIG. 39); the fuse box retainer cover 64c is installed (shown in FIG. 40). Additional wiring, including the antenna and components including the saddlebag support brackets, and the fenders may then be reinstalled, wherein the fenders may attach to the new sub-frame (shown in FIG. 41). Additionally, the ECM module 54 (FIG. 42) and optionally the ABS (anti-lock brake system) module 50, for a motorcycle having ABS may be installed in the battery box 44 as described further below. A new drop seat 28 as shown in FIG. 42 may be installed and adjusted with a seat bracket for proper fitting.

In general, a method of mounting a sub-frame and component configuration on a motorcycle includes:

fixedly securing a drop seat sub-frame portion onto a main frame portion, wherein the drop seat sub-frame portion is fixedly secured to the main frame portion and is configured for receiving and securing thereon a drop seat providing a rider with a seating area that is relatively closer to the ground than the seating area of a conventional motorcycle seat and securing a drop seat to the drop seat sub-frame portion.

Initially, a stock sub-frame portion may be removed from the main frame portion.

Additionally, a turn signal module is removed from the stock-frame portion or a stock battery box, a battery is removed from the stock battery box, and the stock battery box is removed from the motorcycle. Then, the removed turn signal module is mounted to a turn signal module mount attached to the drop seat sub frame.

The drop seat battery box may attach the drop seat sub-frame, wherein the drop seat battery box houses a battery and is adapted to receive one or more of an ABS manifold bracket, an ABS module and an ECM module there within.

Additionally an angled portion of the battery box may be attached to the cross-over tube, wherein the angled portion is configured and positioned to serve as an extension of the motorcycle rear fender to aid in protecting the internal components of the motorcycle from contaminants.

An ignition coil and an ignition mounting module may also be mounted to the drop seat battery box.

In addition, a fuse box assembly including a fuse, a fuse holder, a fuse box retainer, and a fuse box retainer safety wheel assembly may be attached to the drop-seat sub-frame.

It should be understood that the preceding is merely a detailed description of various embodiments of this invention and that numerous changes to the disclosed embodiments can be made in accordance with the disclosure herein without departing from the spirit or scope of the invention. The preceding description, therefore, is not meant to limit the scope of the invention.

What is claimed is:

1. A drop seat assembly for attachment to a mainframe assembly of a motorcycle comprising:
   a sub-frame assembly having a sub-frame portion comprising:
   a. a forward portion having an end adapted for attachment to the mainframe assembly, the forward portion comprises a first segment and a second segment wherein the second segment extends from the first segment at a generally downward angle;
   b. a second portion extending from the forward portion;
   c. a third portion extending from the second portion; and
   d. a rearward portion extending at least in part from the third portion, the rearward portion adapted for supporting a rear fender.

2. The drop seat assembly of claim 1 further comprising:
   a fourth portion extending at least in part from the third portion, the fourth portion having an end adapted for attachment to the mainframe assembly.

3. The drop seat assembly of claim 2 wherein the fourth portion extends from the third portion at a generally downward angle relative to the second portion.

4. The drop seat assembly of claim 1 wherein the third portion extends from the second portion at a generally upward angle.

5. The drop seat assembly of claim 1 wherein the sub-frame portion comprises left and right sub-frame portions.

6. The drop seat assembly of claim 1 wherein at least a segment of the forward portion is coincident with a first plane and the second portion is coincident with a second plane, wherein the first and second plane are generally parallel.

7. A drop seat assembly for attachment to a mainframe assembly of a motorcycle comprising:
   a sub-frame assembly having a sub-frame portion comprising:
   a. a forward portion having an end adapted for attachment to the mainframe assembly;
   b. a rearward portion adapted for supporting a rear fender;
   c. an intermediate portion having opposing portions extending from respective forward and rearward portions; and
   d. at least a section of the intermediate portion is lower than the forward portion.

8. The drop seat assembly of claim 7 wherein at least a section of the forward portion extends generally downwardly.

9. The drop seat assembly of claim 7 wherein at least a section of the rearward portion extends generally downwardly.

10. The drop seat assembly of claim 7 wherein at least a section of the rearward portion extends generally downwardly terminating in an end portion adapted for attachment to the mainframe assembly.

11. The drop seat assembly of claim 7 wherein at least a section of the forward and rearward portions is generally coincident with a first plane and the section of the intermediate portion is generally coincident with a second plane, wherein the second plane is located below the first plane.

12. A drop seat kit for use with a mainframe assembly of a motorcycle comprising:

a sub-frame assembly adapted for attachment to the main-frame assembly, the sub-frame assembly having a sub-frame portion comprising forward, intermediate and rearward portions, wherein at least a section of the intermediate portion extends generally upwardly;

a battery box having opposing portions adapted for removable attachment to the sub-frame assembly; and at least one side portion between the opposing portions of the battery box adapted for removable attachment of an ECM module.

13. The drop seat kit of claim 12 further comprising:
a cavity adapted for removably receiving a battery, the cavity having another side portion opposite the at least one side portion, wherein the side portions are spaced between the opposing portions of the battery box.

14. The drop seat kit of claim 12 further comprising:
a fuse box having:
a. opposing portions forming a frame adapted to removably receive a fuse block; and
b. a fuse holder connected to at least one of the opposing portions of the frame.

15. The drop seat kit of claim 14 further comprising:
a mounting bracket attached to one or more of the opposing portions of the fuse box.

16. The drop seat kit of claim 12 further comprising:
an enclosure on one of the opposing portions, the enclosure adapted to removably receive a turn signal module.

17. The drop seat kit of claim 12 wherein at least one of the opposing portions has a section extending generally upwardly with one or more mounting holes for removably attaching the battery box to the sub-frame assembly.

18. The drop seat kit of claim 12 further comprising:
a shelf portion extending outwardly from the at least one side portion, a section of the shelf portion having one or more cable routing slots.

19. The drop seat kit of claim 12 further comprising:
left and right sub-frame portions connected together at least in part by a cross-member, wherein one of the opposing portions of the battery box is removably attached to the cross member.

* * * * *